US011420116B2

(12) United States Patent
Turner et al.

(10) Patent No.: US 11,420,116 B2
(45) Date of Patent: Aug. 23, 2022

(54) AUGMENTED REALITY MOBILE EDGE COMPUTING

(71) Applicant: Niantic, Inc., San Francisco, CA (US)

(72) Inventors: Peter James Turner, Redwood City, CA (US); Benjamin Peake, Mountain View, CA (US); David Grayson Smith, San Francisco, CA (US); Gandeevan Raghuraman, Santa Clara, CA (US); Si ying Diana Hu, Mountain View, CA (US)

(73) Assignee: Niantic, Inc., San Francisco, CA (US)

( * ) Notice: Subject to any disclaimer, the term of this patent is extended or adjusted under 35 U.S.C. 154(b) by 116 days.

(21) Appl. No.: 16/800,551

(22) Filed: Feb. 25, 2020

(65) Prior Publication Data
US 2020/0269132 A1   Aug. 27, 2020

Related U.S. Application Data (60) Provisional application No. 62/810,115, filed on Feb. 25, 2019.

(51) Int. Cl.
*A63F 13/352*   (2014.01)
*A63F 13/34*   (2014.01)
(Continued)

(52) U.S. Cl.
CPC ............ *A63F 13/352* (2014.09); *A63F 13/34* (2014.09); *G06T 19/006* (2013.01); *H04L 29/06034* (2013.01); *A63F 2300/5566* (2013.01)

(58) Field of Classification Search
CPC ...... G06T 19/006; A63F 13/352; A63F 13/34; A63F 2300/5566
See application file for complete search history.

(56) References Cited

U.S. PATENT DOCUMENTS 6,865,169 B1   3/2005   Quayle et al.
8,619,756 B2   12/2013   Das et al.
(Continued)

FOREIGN PATENT DOCUMENTS

CN   102843349 A   12/2012
CN   102984186 A   3/2013
(Continued)

OTHER PUBLICATIONS

China National Intellectual Property Administration, Office Action, CN Patent Application No. 201980043252.3, dated Jun. 11, 2021, ten pages.

(Continued)

*Primary Examiner* — Omkar A Deodhar
*Assistant Examiner* — Shauna-Kay N Hall
(74) *Attorney, Agent, or Firm* — Fenwick & West LLP (57) ABSTRACT

Processing of actions within a shared augmented reality experience is split between an edge node of a communications network (e.g., a cell tower) and a server. As a result, computation of the current state may be sharded naturally based on real-world location, with state updates generally provided by the edge node and the server providing conflict resolution based on a master state (e.g., where actions connected to different edge nodes potentially interfere with each other). In this way, latency may be reduced as game actions are communicated between clients connected to the same edge node using a peer-to-peer (P2P) protocol without routing the actions via the game server.

20 Claims, 4 Drawing Sheets

(51) Int. Cl.
*G06T 19/00* (2011.01)
*H04L 67/131* (2022.01)

(56) References Cited

U.S. PATENT DOCUMENTS

| | | |
|---|---|---|
| 10,880,407 B2 | 12/2020 | Reynolds et al. |
| 11,077,365 B2 | 8/2021 | Turner et al. |
| 2002/0186701 A1 | 12/2002 | Kaplan et al. |
| 2004/0156345 A1 | 8/2004 | Steer et al. |
| 2004/0203820 A1 | 10/2004 | Billhartz |
| 2007/0104190 A1 | 5/2007 | Harmjanz et al. |
| 2008/0192756 A1 | 8/2008 | Damola et al. |
| 2009/0006473 A1 | 1/2009 | Elliott et al. |
| 2009/0075642 A1 | 3/2009 | Rantapuska et al. |
| 2009/0141713 A1 | 6/2009 | Beverly |
| 2011/0158171 A1 | 6/2011 | Centonza et al. |
| 2012/0195464 A1 | 8/2012 | Ahn |
| 2013/0034047 A1 | 2/2013 | Chan et al. |
| 2013/0159398 A1 | 6/2013 | Weizman |
| 2013/0178257 A1 | 7/2013 | Langseth |
| 2014/0317173 A1 | 10/2014 | Kärkkäinen et al. |
| 2014/0362749 A1 | 12/2014 | Nakamoto et al. |
| 2015/0095402 A1 | 4/2015 | Fraccaroli |
| 2015/0189008 A1 | 7/2015 | Kärkkäinen et al. |
| 2016/0142490 A1 | 5/2016 | Cho et al. |
| 2016/0150005 A1 | 5/2016 | Choi et al. |
| 2016/0175715 A1 | 6/2016 | Ye et al. |
| 2016/0240010 A1 | 8/2016 | Rosenthal et al. |
| 2016/0296840 A1 | 10/2016 | Kaewell et al. |
| 2017/0149656 A1 | 5/2017 | Kumar |
| 2017/0246539 A1* | 8/2017 | Schwartz ............... A63F 13/65 |
| 2017/0310500 A1 | 10/2017 | Dawes |
| 2018/0095541 A1 | 4/2018 | Gribetz et al. |
| 2018/0205773 A1 | 7/2018 | Miller |
| 2018/0213359 A1 | 7/2018 | Reinhardt et al. |
| 2018/0262432 A1 | 9/2018 | Ozen et al. |
| 2018/0352535 A1 | 12/2018 | Graziano |
| 2018/0359811 A1 | 12/2018 | Verzun et al. |
| 2020/0213258 A1* | 7/2020 | Goenka ................... H04L 51/22 |
| 2020/0402312 A1* | 12/2020 | Gratz ..................... G06T 19/006 |

FOREIGN PATENT DOCUMENTS

| | | |
|---|---|---|
| JP | 2011-188358 A | 9/2011 |
| JP | 2016-143076 A | 8/2016 |
| KR | 10-2008-0101891 A | 11/2008 |
| KR | 10-2010-0108354 A | 10/2010 |
| KR | 10-2012-0080410 A | 7/2012 |
| WO | WO 2020/005939 A1 | 1/2020 |
| WO | WO 2020/174404 A1 | 9/2020 |

OTHER PUBLICATIONS

IP Australia, Examination Report No. 1, AU Patent Application No. 2019292191, dated Feb. 10, 2021, four pages.
PCT International Search Report and Written Opinion, PCT Application No. PCT/IB2020/062243, dated Mar. 29, 2021, 12 pages.
European Patent Office, Extended European Search Report and Opinion, EP Patent Application No. 19826018.4, dated Jul. 8, 2021, nine pages.
Japan Patent Office, Office Action, JP Patent Application No. 2020-572883, dated Aug. 10, 2021, three pages.
Taiwan Intellectual Property Office, Office Action, TW Patent Application No. 109145172, dated Jul. 20, 2021, 16 pages.
PCT International Search Report and Written Opinion, PCT Patent Application No. PCT/IB2020/051614, dated Jun. 12, 2020, 10 pages.
European Patent Office, Extended European Search Report and Opinion, EP Patent Application No. 20763709.1, dated Mar. 15, 2022, nine pages.
Liu, H. et al., "Survey of state melding in virtual worlds," ACM Computing Surveys, vol. 44, No. 4, Aug. 2012, pp. 1-25.
United States Office Action, U.S. Appl. No. 17/127,999, dated Jan. 5, 2022, 28 pages.
United States Office Action, U.S. Appl. No. 17/325,137, dated Mar. 15, 2022, six pages.

\* cited by examiner

AUGMENTED REALITY MOBILE EDGE COMPUTING

CROSS-REFERENCE TO RELATED APPLICATIONS

This application claims the benefit of U.S. Provisional Application No. 62/810,115, filed Feb. 25, 2019, which is incorporated by reference.

TECHNICAL FIELD

The present disclosure relates to augmented reality (AR), and in particular to a tiered network architecture for providing low-latency shared AR experiences.

BACKGROUND

In parallel-reality gaming systems, players interact via computing devices in a shared virtual world that parallels at least a portion of the real world. The location of a player in the virtual world is based on the player's location the real world. However, when actions are primarily undertaken with reference to the virtual world, the virtual world can act as a barrier to players engaging with each other. Players interact with the virtual world, making other players seem remote or unreal. As a result, even when many individuals are playing in a geographic region of the real world, the gaming experience may feel individual rather than social.

A parallel-reality gaming system may use one or more protocols to update the game state of the virtual world with which a player interacts to reflect changes (e.g., the results of other players' actions in the game). Communication protocols, such as the User Datagram Protocol (UDP), define systems of rules for exchanging data using computer networks. UDP adheres to a connectionless communication model without guaranteed delivery, ordering, or non-duplicity of datagrams. Computing devices communicating using UDP transmit datagrams, which are basic units for communication each including a header and a payload, to one another via the computer network.

Connectionless communication protocols such as UDP generally have lower overhead and latency than connection-oriented communication protocols like the Transmission Control Protocol (TCP), which establish connections between computing devices before transmitting data. However, existing connectionless communication protocols are inadequate for data transfers that require less latency than is accommodated by the existing art. For example, a parallel-reality game session streaming at 60 frames per second (FPS) may require latency an order of magnitude lower than provided by current techniques. In such a game session, the frames are spaced at approximately sixteen millisecond intervals, while current communication protocols typically provide latency of approximately one hundred milliseconds (or more).

Thus, the latency of these existing connectionless communication protocols provides a barrier between the player and the virtual world in parallel-reality gaming systems. With these existing communication protocols, a player does not interact with the current game state, only a recent game state. For example, in a parallel-reality game, a player may see a virtual object at an old location (e.g., where the object was 100 milliseconds previously), while the virtual positional data in fact has a new location for the virtual object (e.g. the virtual object has been moved by another player). This latency in communication between the client and a server hosting or coordinating the parallel-reality game may lead to a frustrating user experience. This problem may be particularly acute where more than one user is participating in the game because the latency may cause a noticeable delay between the actions of one player showing up in other players' views of the virtual world.

SUMMARY

Augmented reality (AR) systems supplement views of the real world with computer-generated content. Incorporating AR into a parallel-reality game may improve the integration between the real and virtual worlds. AR may also increase interactivity between players by providing opportunities for them to participate in shared gaming experiences in which they interact. For example, in a tank battle game, players might navigate virtual tanks around a real-world location, attempting to destroy each other's tanks. In another example, in a tag battle game, players may attempt to tag each other with energy balls to score points.

Conventional AR session techniques involve a game server maintaining a master game state and periodically synchronizing the local game state of players devices to the master game state via a network (e.g., the internet). However, synchronizing a player's local game state may take a significant amount of time (e.g., ~100 s of milliseconds), which is detrimental to the gaming experience. The player is, in effect, interacting with a past game state rather than the current game state. This problem may be particularly acute where more than one user is participating in the AR game because the latency causes a noticeable delay between the actions of one player showing up in other players' views. For example, if one player moves an AR object in the virtual world, other players may not see it has moved until one hundred milliseconds (or more) later, which is a human-perceptible delay. As such, another player may try to interact with the object in its previous location and be frustrated when the game corrects for the latency (e.g., by declining to implement the action requested by the player).

This and other problems may be addressed by performing some game state processing at an edge node of the network (e.g., a cell tower). As a result, computation of the game state may be sharded naturally based on real-world location, with the master game state maintained by the server providing conflict resolution (e.g., where actions of players connected to nearby cell towers potentially interfere with each other). Latency may also be reduced using a peer-to-peer (P2P) protocol that exchanges game updates between clients connected to the same edge node without routing the updates via the game server. For example, using these approaches, latency may be reduced to ~10 milliseconds or less. Furthermore, this may increase bandwidth availability enabling a greater number of players to share a common AR experience.

In one embodiment, a method for providing a shared AR experience by an edge node includes receiving a connection request from a client at the edge node and identifying a shared AR experience for the client based on the connection request. The method also includes providing map data and a local game state for the shared AR experience to the client. The edge node receives an action request from the client that indicates a desired interaction with a virtual item in the shared AR experience and determines an outcome of the action request based on a local game state maintained by the edge node. The method further includes providing the outcome to a plurality of clients connected to the edge node and validating the outcome with a master game state maintained by a server. The outcome may be validated after the outcome is initially provided to the plurality of clients.

DETAILED DESCRIPTION

The figures and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures. Wherever practicable similar or like reference numbers are used in the figures to indicate similar or like functionality. Where elements share a common numeral followed by a different letter, the elements are similar or identical. The numeral alone refers to any one or any combination of such elements. Although the embodiments described below relate to a parallel-reality game, one of skill in the art will recognize that the disclosed techniques may be used for other types of shared AR experience.

Figure 1:
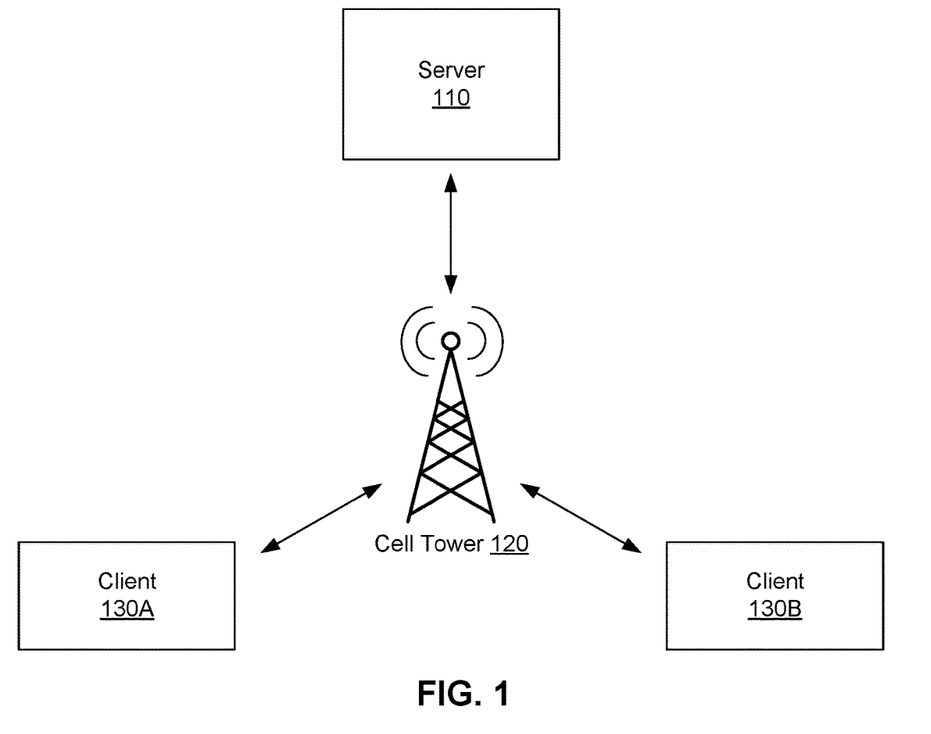
FIG. 1 illustrates one embodiment of a networked computing environment in which AR content is provided to clients.

FIG. 1 illustrates one embodiment of a networked computing environment in which AR content is provided to clients 110. The AR content may be part of a parallel-reality game in which players interact in a shared virtual world that parallels at least a portion of the real world. In the embodiment shown, the networked computing environment includes a server 110, a cell tower 120, and two clients 130. Although only two clients 130 are shown for convenience, in practice, more (e.g., tens or hundreds of) clients 130 may be connected to the cell tower 120. In other embodiments, the networked computing environment may include different or additional components. For example, the networked computing environment may be a local area network (LAN) using a WiFi router as an edge node rather than a cell tower 120. In addition, the functions may be distributed among the elements in a different manner than described.

The server 110 is one or more computing devices that provide services to clients 130 in a communications network. The server 110 communicates with the clients 130 via edge nodes of the communications network (e.g., cell towers 120). In one embodiment, the server 130 maintains a master game state for a parallel-reality game that is, ultimately, the ground truth state of the parallel reality game. In this context, the master game state corresponds to the ground truth state in that, where conflicts arise between the master game state and a local game state, the master game state governs. This may be particularly useful where two local game states (e.g., two local game states maintained by adjacent cell towers 120 in a network) correspond to overlapping geographic areas. Thus, devices connected to both cell towers 120 may interact with the same game content (in the master game state) while being connected to different AR sessions.

The cell tower 120 is an edge node via which clients 110 connect to the communications network. As described above, the computer network may include other edge nodes in addition to or replacing a cell tower 120 but enabling similar communication. In one embodiment, a cell tower includes one or more computing devices configured to store AR data and provide AR services to connected clients 130. Because the clients 130 are located relatively close to the cell tower and connect directly to it, the lag time in providing data and services to the clients may be significantly shorter than for the server 110. Various embodiments of the cell tower 120 are described in greater detail below, with reference to FIG. 4.

Clients 130 are computing devices such as personal computers, laptops, tablets, smartphones, or the like. In embodiments involving a parallel-reality game, the clients 130 are typically smartphones or tablets that have connected or built-in cameras and which players can easily carry. A client (e.g., client 130A) may communicate by sending P2P messages to the cell tower 120 which forwards them to other clients (e.g., client 130B) connected to the same cell tower. Clients 130 may also communicate with one another by sending messages to the server 110 (via the cell tower 120), which in turn forwards them to the recipient. For example, a client 130A may send a message to another client 130B that is connected to a different cell tower 120 or the server 110 in this manner.

In one embodiment, client communications may be routed through the server 110 or peer-to-peer (P2P). Communications routed through the server 110 may go from a first client 130A to the server 110 via the cell tower 120 and then back through a cell tower 120 to a second client 130B. In contrast, P2P communication may go from the first client 130A to the cell tower 120 and then directly to the second client 130B. Note that in some cases, the communications may pass through other intermediary devices (or nodes), such as signal boosters. As used herein, a communication is considered P2P if it is routed from a sending client 130A to a target client 130B without passing through the server 110. This may reduce latency by bypassing the need to send the communication to the server 110 before the communication is sent to the target client 130B. For example, a message (e.g., a datagram) may be sent P2P if the target client 130B is connected to the same cell tower 120 as the sending client 130A and may be routed via the server 110 otherwise. In another embodiment, clients 130 communicate entirely using P2P communications.

In one embodiment, the clients 130 use a coordination service (e.g., hosted at the server and communicated with via TCP) to synchronize IP addresses. The clients 130 can thus communicate (e.g., via UDP) using public facing IP addresses or a local area network (LAN). For example, a first client 130A can send a request via TCP to the coordination service to join a local AR shared experience. The coordination service may provide the first client 130A with the IP address of a second client 130B connected to the AR session providing the AR experience (e.g., via the same cell tower 120). The coordination service may also provide the first client's IP address to the second client 130B or the first client 130A may provide it directly using the second client's IP address (as provided by the coordination service). In some embodiments, the coordination service may prompt the second client 130B to approve the first client 130A (e.g., by requesting user confirmation or checking a list of approved clients 130 to connect with the second client 130B) before the second client's IP address is provided.

Among other advantages, structuring the networked computing environment in the manner shown in FIG. 1 enables efficient distribution of computation. Information may be exchanged P2P between clients 130 with a short lag time, enabling players to interact within a shared AR experience in a similar manner than they would interact in the real world. Similarly, the cell tower 120 can determine what map data to provide to clients 130 and synchronize game state between connected clients 130. The cell tower 120 may synchronize the game state with less lag than would result from synchronizing same state globally with the server 110. The server 110 may then be used to handle longer term processing and resolve conflicts. For example, the server 110 may manage connections between geographic regions handled by different cell towers 120, double check determinations made by cell towers (and make corrections if needed), perform additional security checks, analyze data received from clients 130 to detect cheating, maintain global data (e.g., total team score for regions that are larger than the coverage of a single cell tower), and the like.

Example P2P Protocol

Figure 2:
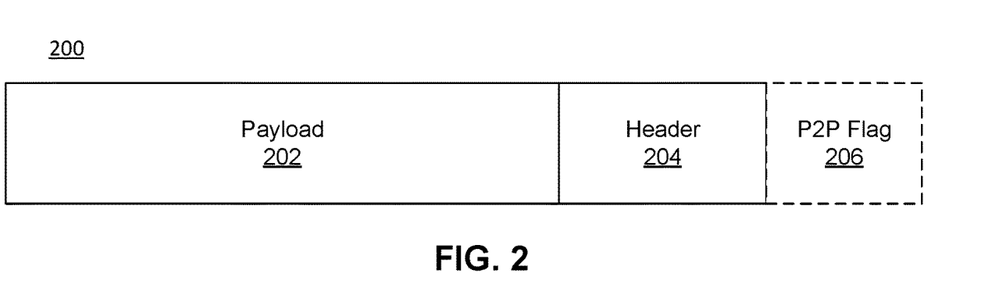
FIG. 2 is a block diagram of a datagram suitable for use within the networked computing environment of FIG. 1, according to one embodiment.

FIG. 2 illustrates one embodiment of a datagram 200 suitable for use in the networked computing environment of FIG. 1. As previously described, a datagram 200 is a basic unit for communication. In the embodiment shown, the datagram 200 includes a payload 202 and a header 204, the latter including a P2P flag 206, also known as an indicator. The header 204 is metadata specifying aspects of the datagram 200, such as a source port, a destination port, a length of the datagram 200, and a checksum of the datagram 200. The payload 202 is the data communicated by the datagram 200. In other embodiments, the datagram 200 may include different or additional elements.

The payload 202 includes the content of the datagram 200 that is intended for delivery to the recipient client or clients 130. In one embodiment, the header 204 may be similar to a UDP header with the addition of the P2P flag 206. The header 204 may also contain additional metadata. The P2P flag 206 is used to determine whether the datagram 200 is sent to the server 120 or is sent P2P to another client 130. In other embodiments the P2P flag 206 is replaced with one or more other indicators within the header providing similar functionality.

Figure 3:
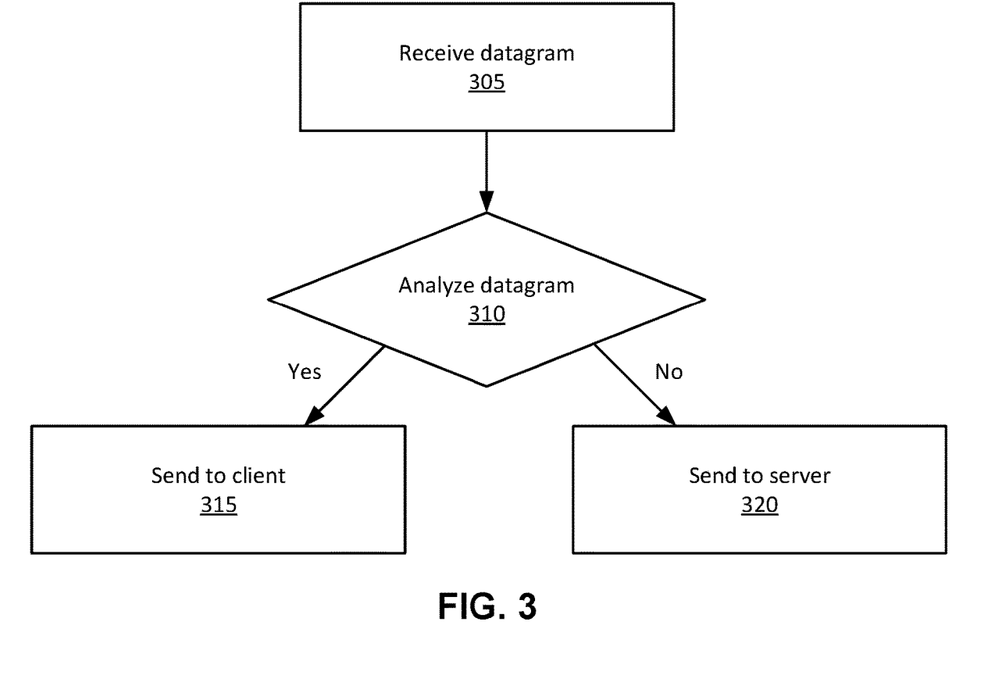
FIG. 3 is a flowchart illustrating a process for routing a datagram by an edge node of the networked computing environment, according to one embodiment.

FIG. 3 is a flowchart illustrating a process for using a P2P communication protocol at an edge node (e.g., a cell tower 120), according to one embodiment. In FIG. 3, the cell tower 120 receives 305 a datagram 200 from a client 130A. The cell tower 120 analyzes 310 the datagram 200 to determine whether it should be sent P2P or via the server 110. In one embodiment, the P2P flag 206 indicates the datagram 200 is a P2P message, and the cell tower 120 sends 315 the datagram 200 to one or more clients 130 connected to the client 130A. For example, if the header 204 of the datagram 200 indicates the destination port is that of client 130B, the cell tower 120 sends 315 the datagram 200 to client 130B. Alternatively, the cell tower may maintain a list of connected clients 130 that are engaged in a local AR session and send 315 the datagram 200 to all clients 130 (or a subset of clients, such as those corresponding to a player's teammates) engaged in the local AR session. In contrast, if the P2P flag 206 indicates the datagram 200 is directed to the server 110, the cell tower 120 sends 320 the datagram 200 to the server 110.

In another embodiment, the sending client 130A may set the P2P flag 206 to indicate that the datagram 200 should be sent P2P if possible. The cell tower 120 receives 305 and analyzes 310 the datagram 200 and, assuming the P2P flag 206 indicates the datagram 200 should be sent P2P, determines whether a target client 130B is currently connected to the cell tower 120 (e.g., by comparing an identifier of the target client 130B to the list of currently connected clients 130). If the target client 130B is connected to the cell tower 120, the cell tower 120 sends 315 the datagram 200 straight to the target client 130B instead of going via the server 110. In contrast, if the target client 130B is not connected to the cell tower 120, the cell tower 120 sends 320 the datagram 200 to the server 110 to be sent on to the target client 130B (e.g., via a second cell tower 120 to which it is currently connected). For example, the server 110 might maintain a database or other list of which cell towers 120 are currently or have been recently connected to which client devices 130. In some embodiments, the cell tower 120 may send the datagram 200 to both the target client 130B and the server 110.

In other embodiments, the P2P flag 206 may be an identifier of an entity such as an AR session, a user, a device, a game account, or the like. The cell tower 120 maintains a list of P2P flags 206 for which the datagram 200 should be sent P2P (or P2P if possible). The cell tower 120 receives 305 and analyzes 310 the datagram 200 to determine whether it should be sent via the server 110 or P2P. If the P2P flag 206 includes an identifier of an entity on the list, the datagram 200 is a P2P message and the cell tower 120 sends 315 the datagram 200 to one or more clients 130B associated with the identified entity. For example, if the header 204 of the datagram 200 includes an identifier of the target client 130B, the cell tower 120 sends 315 the datagram 200 to the target client 130B. To give other examples, if the P2P flag 206 identifies an AR session, the datagram 200 is sent to all clients 130 connected to that session, and if it is a game account, the datagram is sent to one or more clients associated with that game account, etc. In contrast, if the P2P flag 206 identifies an entity that is not on the list, the cell tower 120 sends 320 the P2P flag 206 to the server 110 to be forwarded to clients 130 associated with the entity. Alternatively, the list may indicate P2P flags 206 for messages that are not to be sent P2P, in which case the default behavior if the P2P flag 206 is not on the list is to send the corresponding datagram P2P to the target client 130B.

Example Edge Node

Figure 4:
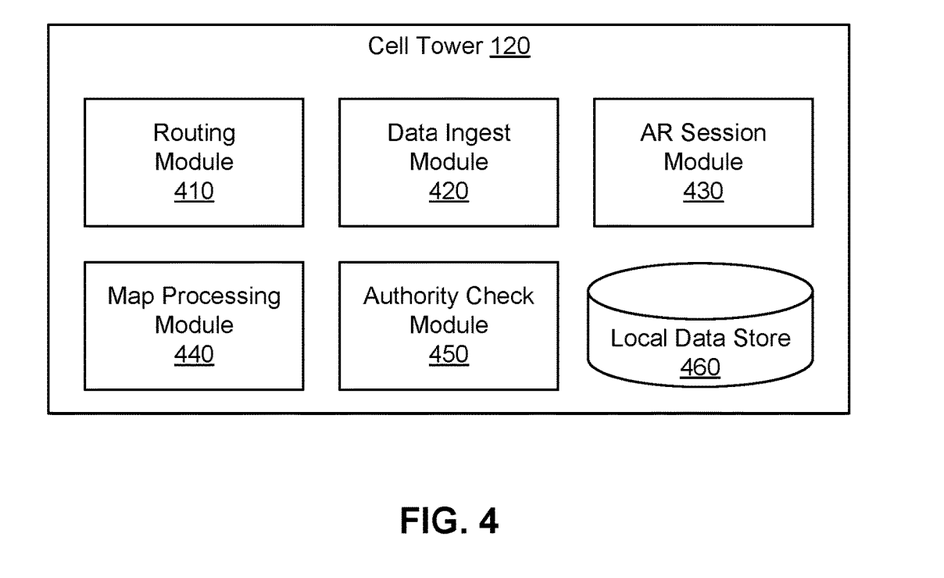
FIG. 4 is a block diagram illustrating the cell tower of FIG. 1, according to one embodiment.

FIG. 4 illustrates one embodiment of an edge node in a communications network. In the embodiment shown, the edge node is a cell tower 120 that includes a routing module 410, a data ingest module 420, an AR session module 430, a map processing module 440, an authority check module 450, and a local data store 460. The cell tower 120 also includes hardware and firmware or software (not shown) for establishing connections to the server 110 and clients 130 for exchanging data. For example, the cell tower 120 may connect to the server 110 via a fiberoptic or other wired internet connection and clients 130 using a wireless connection (e.g., 4G or 5G). In other embodiments, the cell tower 120 may include different or additional components. In addition, the functions may be distributed among the elements in a different manner than described.

The routing module 410 receives data packets and sends those packets to one or more recipient devices. In one embodiment, the routing module 410 receives datagrams 200 from clients 130 and uses the method described previously with reference to FIG. 3 to determine where to send the received datagrams. The routing module 410 may also receive data packets from the server addressed to either particular clients 130 or all clients that are connected to the cell tower 120. The routing module 410 forwards the data packets to the clients 130 to which the data packets are addressed.

The data ingest module 420 receives data from one or more sources that the cell tower 120 uses to provide a shared AR experience to players via the connected clients 130. In one embodiment, the data ingest module 420 receives real-time or substantially real-time information about real-world conditions (e.g., from third party services). For example, the data ingest module 420 might periodically (e.g., hourly) receive weather data from a weather service indicating weather conditions in the geographic area surrounding the cell tower 120. As another example, the data ingest module 420 might retrieve opening hours for a park, museum, or other public space. As yet another example, the data ingest module 420 may receive traffic data indicating how many vehicles are traveling on roads in the geographic area surrounding the cell tower 120. Such information about real-world conditions may be used to improve the synergy between the virtual and real worlds.

The AR session module 430 manages AR sessions in which players in the geographic area surrounding the cell tower 120 may engage in shared AR experiences. In one embodiment, a client 130 connects to the cell tower 120 while executing an AR game and the AR session module 430 connects the client 130 to an AR session for the game. All players of the game who connect to the cell tower 120 may share a single AR session or players may be divided among multiple AR sessions. For example, there may be a maximum number of players in a particular AR session (e.g., ten, twenty, one hundred, etc.). Where there are multiple AR sessions, newly connecting clients 130 may be placed in a session randomly or a client 130 may provide a user interface (UI) to enable the player to select which session to join. Thus, a player may elect to engage in an AR session with friends. In some embodiments, players may establish private AR sessions that are access protected (e.g., requiring a password or code to join).

In various embodiments, to enable AR objects (e.g., creatures, vehicles, etc.) to appear to interact with real-world features (e.g., to jump over obstacles rather than going through them), the AR session module 430 provides connected clients 130 with map data representing the real world in the proximity of the client (e.g., stored in the local data store 460). The AR session module 430 may receive location data for a client 130 (e.g., a GPS location) and provide map data for the geographic area surrounding the client (e.g., within a threshold distance of the client's current position).

The map data can include one or more different types of representations of the real world. For example, the map data can include a point cloud model, a plane matching model, a line matching model, a geographic information system (GIS) model, a building recognition model, a landscape recognition model, etc. The map data may also include more than one representation of a given type at different levels of detail. For example, the map data may include two or more point cloud models, each including different number of points.

The client 130 may compare the map data to data collected by one or more sensors on the client 130 to refine the client's location. For example, by mapping the images being captured by a camera on the client 130 to a point cloud model, the client's location and orientation may be accurately determined (e.g., to within one centimeter and 0.1 degrees). The client 130 provides the determined location and orientation back to the AR session module 430 along with any actions taken by the player (e.g., shooting, selecting a virtual item to interact with, dropping a virtual item, etc.). Thus, the AR session module 430 can update the status of the game for all players engaged in the AR session to accurately reflect players' locations in the AR session.

The map processing module 440 updates map data based on current conditions (e.g., data from the data ingest module 420). Because the real world is not static, the map data in the local data store 460 may not represent current real-world conditions. For example, the same park trail in Vermont may look very different in different seasons. In summer, the trail may be clear and the surrounding trees may be covered in foliage. In contrast, in winter, the trail may be blocked by snow drifts and the trees may be bare. The map processing module 440 may transform the map data to approximate such changes.

In one embodiment, the map processing module 440 retrieves current condition data to identify a transformation and applies that transformation to the map data. The transformations for different conditions may be defined by heuristic rules, take the form of trained machine-learning models, or use a combination of both approaches. For example, the map processing module 440 might receive current weather condition data, select a transformation for the current weather conditions, and apply that transformation to the map data. Alternatively, the map processing module 440 may pre-calculate the transformed maps and store them (e.g., in the local data store 460). In this case, when a client 130 connects to the cell tower 120, the map processing module 440 determines the current conditions, selects the appropriate pre-calculated version of the map data, and provides that version to the client 130.

The authority check module 450 maintains synchronization between game states of different clients 130. In one embodiment, the authority check module 450 confirms that game actions received from clients 130 are consistent with the game state maintained by the AR session module 430. For example, if two players both try to pick up the same in-game item, the authority check module 450 determines which player receives the item (e.g., based on timestamps associated with the requests). As described, the use of a P2P protocol and local processing at the cell tower 120 may significantly reduce the latency of a player's actions being seen at other players' clients 130 during an AR session by providing the outcome of an action requested by a player (e.g., capturing a virtual object) directly to other players' clients 130. Therefore, the likelihood (and number) of instances of conflicts between actions arising and being resolved by the authority check module 450 is reduced and the AR experience may be improved.

The authority check module 450 may also maintain synchronization between its local copy of the game state and a master game state maintained by the server 110. In one embodiment, the authority check module 450 periodically (e.g., every one to ten seconds) receives global updates regarding the game state from the server 110. The authority check module 450 compares these updates to the local copy of the game state and resolves any discrepancies. For example, if a player's request to pick up an item was initially approved by the authority check module 450 but a game update from the server 110 indicates the item was picked up by another player (or otherwise made unavailable) before the player attempted to pick it up, the authority check module 450 might send an update to the player's client 130 indicating the item should be removed from the player's inventory.

This process may provide value for clients 130 located close to a boundary between coverage provided by different cell towers 120. In this case, players connected to different cell towers 120 may both be able to interact with the same virtual element. Thus, each individual cell tower 120 might initially approve conflicting interactions with the element, but the sever 110 would detect the conflict and send updates to resolve the conflict (e.g., instructing one of the cell towers 120 to revoke its initial approval of the action and update its local game state accordingly).

The local data store 460 is one or more non-transitory computer-readable media configured to store data used by the cell tower 120. In one embodiment, the stored data may include map data, current conditions data, a list of currently (or recently) connected clients 130, a list of P2P flags, a local copy of the game state for the geographic region, etc. Although the local data store 460 is shown as a single entity, the data may be split across multiple storage media. Furthermore, some of the data may be stored elsewhere in the communication network and accessed remotely. For example, the cell tower 120 may access current condition data remotely (e.g., from a third-party server) as needed.

Example Method

Figure 5:
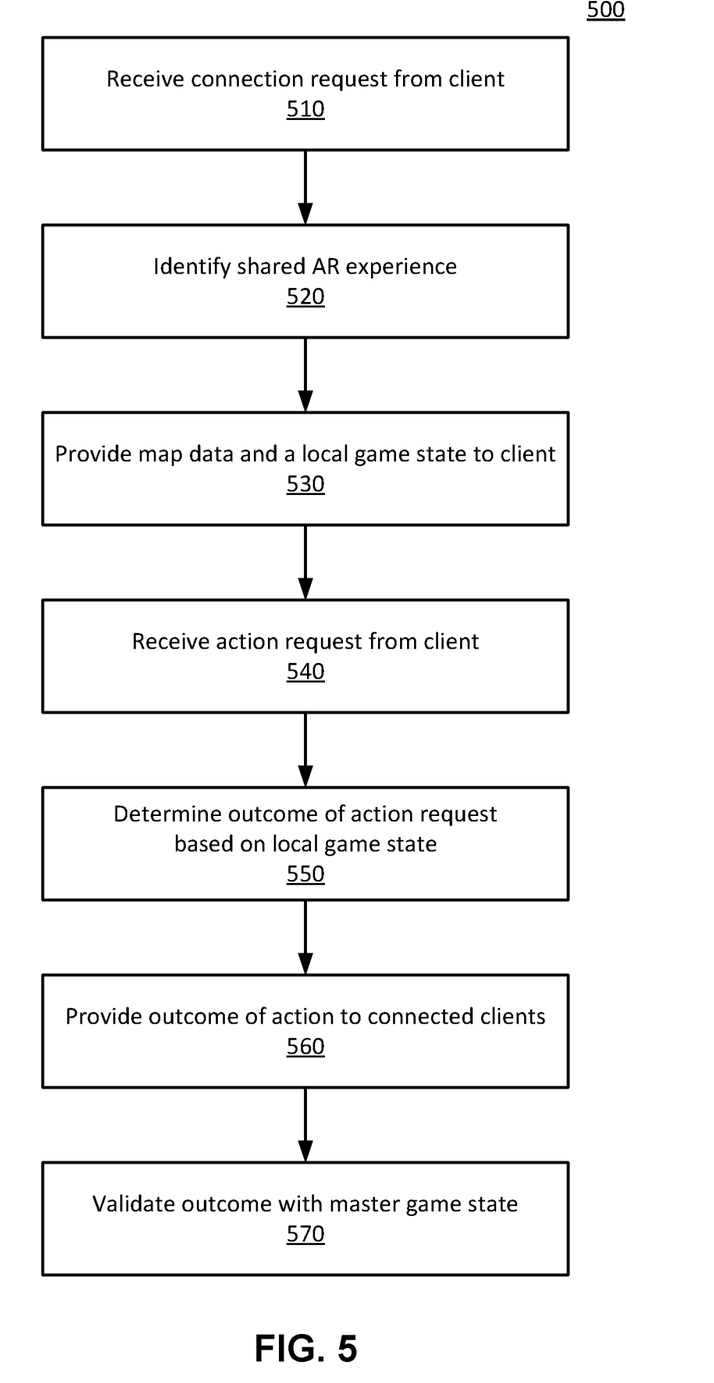
FIG. 5 is a flowchart illustrating a method for providing a shared AR experience, according to one embodiment.

FIG. 5 illustrates a method 500 of providing a shared AR experience, according to one embodiment. The steps of FIG. 5 are illustrated from the perspective of an edge node (e.g., a cell tower 120) performing the method 500. However, some or all of the steps may be performed by other entities or components. In addition, some embodiments may perform the steps in parallel, perform the steps in different orders, or perform different steps.

In the embodiment shown in FIG. 5, the method 500 begins with the cell tower 120 receiving 510 a connection request from a client 130. The connection request may include one or more of an identifier of the client 130, an identifier of a game, a player identifier (e.g., a username), current location data for the client 130 (e.g., a GPS position), etc. The connection request may be split into more than one portion. For example, the client 130 may first establish a communication channel with the cell tower 120 and then an AR game executing on the client 130 may send a request to join a shared AR session to provide the shared AR experience.

The cell tower 120 identifies 520 a shared AR session for the client 130. The particular shared AR session may be selected based on the particular AR game executing on the client 130, information about the player (e.g., the cell tower may favor connecting players with their contacts or other players with similar in-game profiles, etc.), numbers of players already connected to ongoing AR sessions, etc. In one embodiment, the client 130 identifies which shared AR session to join (e.g., based on player input), which is communicated to the cell tower 120. Note that, in some instances, there may only be a single shared AR session available. In which case, the cell tower 120 may automatically connect the client 130 to that shared AR session.

The cell tower 120 provides 530 map data and a local game state for the shared AR session to the client 130. In one embodiment, the cell tower uses position data received from the client 130 (e.g., GPS data) to identify a subset of the available map data to provide 550 to the client. For example, the cell tower 120 may provide map data describing real-world locations within a threshold distance of the client 130 (e.g., within one hundred meters). As described previously, the map data may include one or more models representing the real-world geographic area around the client 130. The client 130 uses the map data to locate the client 130 within the shared AR session and presents an AR experience including AR content based on the local game state (e.g., virtual items, creatures, signs, etc.).

The cell tower 120 receives 540 an action request from the client 130. The action request may represent any desired interaction between the player and content in the AR experience, such as a virtual item, virtual character, virtual creature, or other player. For example, the player may desire to: pick up a virtual item, drop a virtual item, use a virtual item, interact with a virtual item, talk to a virtual character, attack a virtual creature, attack another player, etc. One of skill in the art will recognize a wide range of possible actions that may be performed, depending on the specific nature of the AR game.

The cell tower 120 determines 550 an outcome for the action request based on the game state. The outcome may be based on a series of rules that may have various levels of complexity, depending on the particular action. For example, if the action is picking up a virtual item, the action may simply succeed unless the cell tower determines another player has already picked up, moved, or destroyed the item. As noted previously, due to the reduced latency achieved using the disclosed techniques, this may be a rare occurrence. In contrast, if the action is an attack on a virtual creature, the outcome may be based on a set of calculations and virtual die roles. One of skill in the art will recognize a wide range of possible rule sets and approaches that may be used to determine the outcome of an action.

The cell tower 120 provides 560 the outcome of the action to connected clients 130. In one embodiment, the cell tower 120 provides the result to all clients 130 connected to the AR session. In another embodiment, the cell tower 120 provides the result to only those clients 130 within a threshold real-world distance of the player performing the action (e.g., one hundred meters). As the latency resulting from the disclosed techniques is relatively low (e.g., ten milliseconds or less), players may experience the results of the action substantially in real time. Thus, the players may get the impression that they are directly interacting with each other in the shared AR experience.

The cell tower 120 validates 570 the outcome of the action with a master game state maintained by the server 110. In some embodiments, the cell tower 120 sends an indication to the server 110 to update the master game state reflect any actions taken by players in its local game state, provided the actions are proved valid in view of the master game state. In one embodiment, the cell tower 120 periodically (e.g., every one to ten seconds) verifies that its local game state is consistent with the master game state. As described previously, this may be particularly useful at the edge of the region covered by the cell tower 120 to handle cases where the actions of players connected to different cell towers 120 may interfere with each other. If a discrepancy between the local game state and the master game state is detected, the cell tower 120 may push an update to connected clients 130 to synchronize their game states to the master game state. Further, in some embodiments, the cell tower 120 may send an action and its outcome to the server for validation, and if the server indicates that the outcome conflicts with the master game state, the cell tower 120 updates the local game state to revoke the outcome.

Example Computing System

Figure 6:
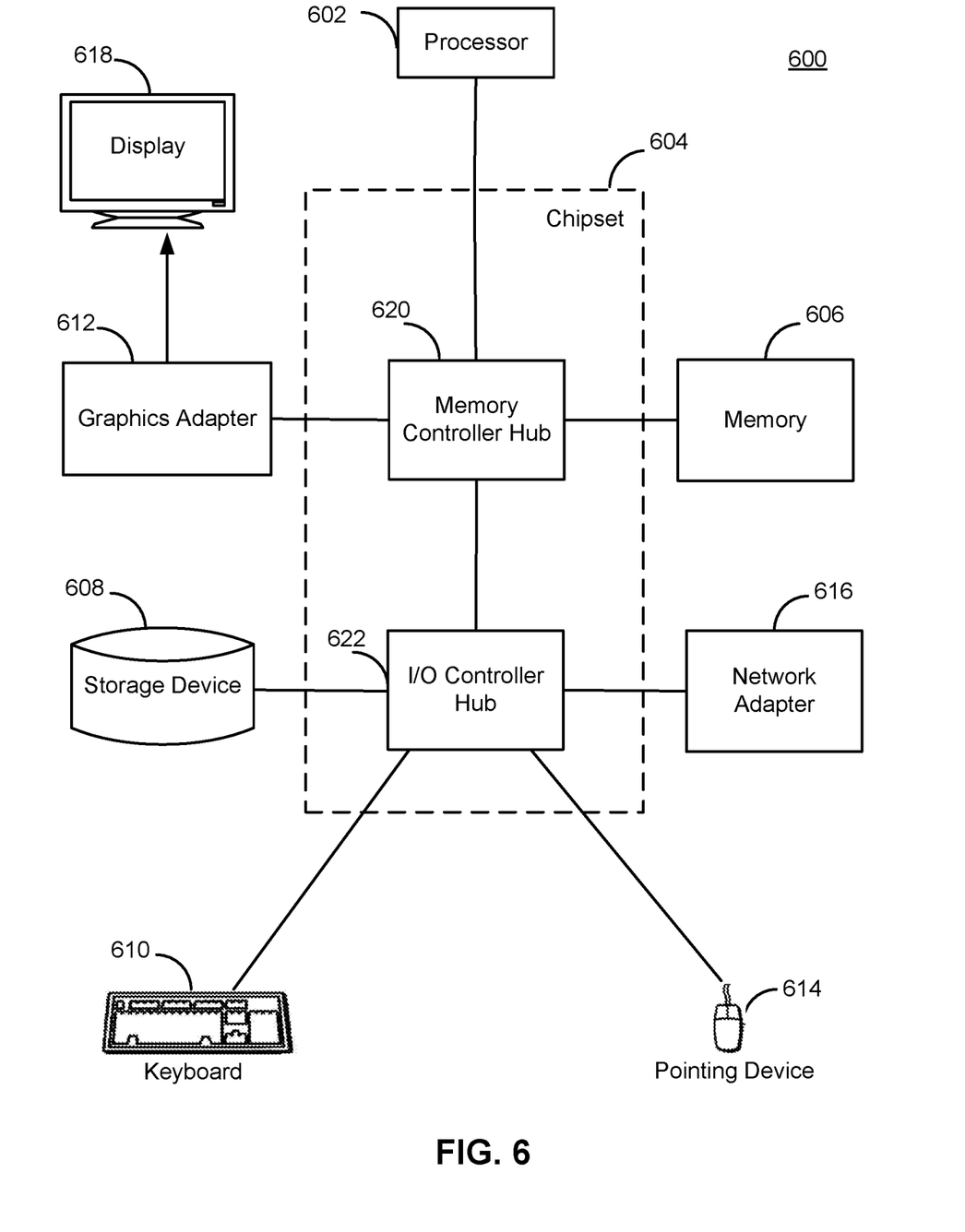
FIG. 6 is a block diagram illustrating an example of a computer suitable for use in the networked computing environment of FIG. 1, according to one embodiment.

FIG. 6 is a high-level block diagram illustrating an example computer 600 suitable for use within the networked computing environment 100 shown in FIG. 1, according to an embodiment. The example computer 600 includes at least one processor 602 coupled to a chipset 604. For convenience, the processor 602 is referred to as a single entity but it should be understood that the corresponding functionality may be distributed among multiple processors using various ways, including using multi-core processors, assigning certain operations to specialized processors (e.g., graphics processing units), and dividing operations across a distributed computing environment. Any reference to a processor 602 should be construed to include such architectures.

The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, keyboard 610, pointing device 614, and network adapter 616 are coupled to the I/O controller hub 622. Other embodiments of the computer 600 have different architectures.

In the embodiment shown in FIG. 6, the storage device 608 is a non-transitory computer-readable storage medium such as a hard drive, compact disk read-only memory (CD-ROM), DVD, or a solid-state memory device. The memory 606 holds instructions and data used by the processor 602. The pointing device 614 is a mouse, track ball, touch-screen, or other type of pointing device, and is used in combination with the keyboard 610 (which may be an on-screen keyboard) to input data into the computer system 600. The graphics adapter 612 displays images and other information on the display 618. The network adapter 616 couples the computer system 600 to one or more computer networks.

The types of computers used by the entities of FIG. 1 can vary depending upon the embodiment and the processing power required by the entity. For example, a server 110 might include a distributed database system comprising multiple servers working together to provide the functionality described. Furthermore, the computers can lack some of the components described above, such as keyboards 610, graphics adapters 612, and displays 618.

Additional Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiments.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Finally, while particular embodiments and applications have been illustrated and described, it is to be understood that these embodiments are illustrative. Various modifications, changes, and variations to the disclosed examples may be apparent to those skilled in the art. Accordingly, the disclosed embodiments should not be considered limiting on the scope of protection. Rather, the scope of protection should be limited only by the following claims.

What is claimed is:

1. A method for providing a shared augmented reality (AR) experience by an edge node of a communications network, the method comprising:
   receiving, at the edge node, a connection request from a client;
   identifying a shared AR session for the client based on the connection request;
   providing, to the client, map data and a local state, maintained by the edge node, of an AR experience provided by the shared AR session;
   receiving an action request from the client, the action request indicating a desired interaction with a virtual item in the AR experience;
   determining an outcome of the action request based on the local state of the AR experience;
   providing the outcome to a plurality of clients connected to the edge node; and
   validating, after providing the outcome to the plurality of clients, the outcome with a master state of the AR experience maintained by a server, wherein validation comprises verifying that the outcome does not conflict with the master state.

2. The method of claim 1, wherein the edge node is a cell tower connected to a plurality of clients and the server.

3. The method of claim 1, wherein the action request is included in a datagram, the method further comprising:
   analyzing the datagram to determine whether to send the outcome peer-to-peer based on a flag in the datagram;
   responsive to determining to send the outcome peer-to-peer, providing the outcome directly to one or more of the plurality of clients at the edge node; and responsive to determining to not send the outcome peer-to-peer, providing the outcome to the server.

4. The method of claim 1, wherein the map data includes one or more of: a point cloud model, a plane matching model, a line matching model, a geographic information system (GIS) model, a building recognition module, and a landscape recognition model.

5. The method of claim 1, further comprising:
receiving a position of the client; and
identifying a subset of available map data to provide to the client as map data, the subset of available map data within a threshold distance of the position of the client.

6. The method of claim 1, wherein the master state is computed using a plurality of different local states, each local state maintained by a different edge node at a different real-world location.

7. The method of claim 1, wherein validating the outcome with the master state of the AR experience comprises:
responsive to receiving an indication from the server that the outcome conflicts with the master state, updating the local state to revoke the outcome; and
sending an update to each of the plurality of clients indicating that the outcome was revoked.

8. A non-transitory computer-readable storage medium comprising instructions executable by a processor, the instructions comprising:
instructions for receiving, at an edge node of a communications network, a connection request from a client;
instructions for identifying a shared AR session for the client based on the connection request;
instructions for providing, to the client, map data and a local state, maintained by the edge node, of an AR experience provided by the shared AR session;
instructions for receiving an action request from the client, the action request indicating a desired interaction with a virtual item in the AR experience;
instructions for determining an outcome of the action request based on the local state of the AR experience;
instructions for providing the outcome to a plurality of clients connected to the edge node; and
instructions for validating, after providing the outcome to the plurality of clients, the outcome with a master state of the AR experience maintained by a server, wherein validation comprises verifying that the outcome does not conflict with the master state.

9. The non-transitory computer-readable storage medium of claim 8, wherein the edge node is a cell tower connected to a plurality of clients and the server.

10. The non-transitory computer-readable storage medium of claim 8, wherein the action request is included in a datagram, wherein the instructions further comprise:
instructions for analyzing the datagram to determine whether to send the outcome peer-to-peer based on a flag in the datagram;
responsive to determining to send the outcome peer-to-peer, instructions for providing the outcome directly to one or more of the plurality of clients at the edge node; and
responsive to determining to not send the outcome peer-to-peer, instructions for providing the outcome to the server.

11. The non-transitory computer-readable storage medium of claim 8, wherein the map data includes one or more of: a point cloud model, a plane matching model, a line matching model, a geographic information system (GIS) model, a building recognition module, and a landscape recognition model.

12. The non-transitory computer-readable storage medium of claim 8, wherein the instructions further comprise:
instructions for receiving a position of the client; and
instructions for identifying a subset of available map data to provide to the client as map data, the subset of available map data within a threshold distance of the position of the client.

13. The non-transitory computer-readable storage medium of claim 8, wherein the master state is computed using a plurality of different local states, each local state maintained by a different edge node at a different real-world location.

14. The non-transitory computer-readable storage medium of claim 8, wherein the instructions for validating, after providing the outcome to the plurality of clients, the outcome with a master game state maintained by the server comprise:
responsive to receiving an indication from the server that the outcome conflicts with the master state, instructions for updating the local state to revoke the outcome; and
instructions for sending an update to each of the plurality of clients indicating that the outcome was revoked.

15. An edge node of a computing network, the edge node comprising:
a local data store storing a list of one or more clients connected to the edge node; and
a routing module configured to perform operations comprising:
receiving a connection request from an additional client;
identifying a shared AR session for the additional client based on the connection request;
providing, to the additional client, map data and a local state, maintained by the edge node, of an AR experience provided by the shared AR session;
receiving an action request from the additional client, the action request indicating a desired interaction with a virtual item in the AR experience;
determining an outcome of the action request based on the local state of the AR experience;
providing the outcome to the one or more clients connected to the edge node; and
validating, after providing the outcome to the one or more clients connected to the edge node, the outcome with a master state of the AR experience maintained by a server, wherein validation comprises verifying that the outcome does not conflict with the master state.

16. The edge node of claim 15, wherein the action request is included in a datagram, wherein the operations further comprise:
analyzing the datagram to determine whether to send the outcome peer-to-peer based on a flag in the datagram;
responsive to determining to send the outcome peer-to-peer, providing the outcome directly to the one or more clients on the list; and
responsive to determining to not send the outcome peer-to-peer, providing the outcome to the server.

17. The edge node of claim 15, wherein the map data includes one or more of: a point cloud model, a plane matching model, a line matching model, a geographic information system (GIS) model, a building recognition module, and a landscape recognition model.

18. The edge node of claim 15, wherein the operations further comprise:
receiving a position of the additional client; and identifying a subset of available map data to provide to the additional client as map data, the subset of available map data within a threshold distance of the position of the additional client.

19. The edge node of claim 15, wherein the master state is determined using a plurality of different local states, each local state maintained by a different edge node at a different real-world location.

20. The edge node of claim 15, wherein validating the outcome with the master state of the AR experience comprises:
responsive to receiving an indication from the server that the outcome conflicts with the master state, updating the local state to revoke the outcome; and
sending an update to each of the one or more clients indicating that the outcome was revoked.

* * * * *